United States Patent
Gupta et al.

(10) Patent No.: US 6,851,783 B1
(45) Date of Patent: Feb. 8, 2005

(54) REPLACEMENT HALFTONING

(75) Inventors: Maya Rani Gupta, Menlo Park, CA (US); Hiroshi Takahashi, Kawasaki (JP)

(73) Assignee: Ricoh Co., Ltd., Tokyo (JP)

( * ) Notice: Subject to any disclaimer, the term of this patent is extended or adjusted under 35 U.S.C. 154(b) by 0 days.

(21) Appl. No.: 10/404,273

(22) Filed: Mar. 31, 2003

(51) Int. Cl.$^7$ .............................. B41J 2/205; B41J 2/21; H04N 1/46

(52) U.S. Cl. ........................... 347/15; 347/43; 358/1.9; 358/535

(58) Field of Search .................... 347/15, 43; 358/3.03, 358/3.06, 3.09, 3.13, 2.1, 535

(56) References Cited

U.S. PATENT DOCUMENTS 6,204,934 B1 * 3/2001 Minamino .................. 358/1.9
6,643,031 B1 * 11/2003 Takano et al. ............... 358/1.9
2002/0003633 A1 * 1/2002 Matsumoto et al. ......... 358/1.9

* cited by examiner

Primary Examiner—Stephen D. Meier
Assistant Examiner—Alfred Duidding
(74) Attorney, Agent, or Firm—Blakely, Sokoloff, Taylor & Zafman LLP (57) ABSTRACT

A method and an apparatus to perform replacement halftoning is disclosed. In one embodiment, the method comprises dithering multiple color channels of a pixel of an image to generate a plurality of halftone outputs. Each of the halftones corresponds to a distinct color channel of the pixel. The method further includes creating a virtual color channel from two or more color channels of the plurality of color channels and applying error diffusion to the virtual color channel to generate an error diffusion halftone outputs, and then replacing of the dither output error diffusion halftone outputs.

27 Claims, 6 Drawing Sheets

REPLACEMENT HALFTONING

FIELD OF INVENTION

The present invention relates to printing technologies, and more particularly, to halftoning images.

BACKGROUND

Halftoning is a technique used in printing images. Currently, there are various methods to halftone an image. In general terms, halftoning converts a continuous tone image to a multilevel image. The simplest halftoning method merely rounds each pixel to either black or white, corresponding to ink dot on and ink dot off respectively. For example, a one-dimensional two-level quantizer, $Q(x)$ is the rounding function, where x is a number between 0 and 1. When x is less than 0.5, $Q(x)$ is set to 1. Otherwise, $Q(x)$, is set to 0. Suppose f[i,j] is the original continuous tone image brightness at position [i,j] in an image. The simplest halftoning method rounds off the brightness value, which can be expressed as Halftone[i,j]=$Q(f[i,j])$. However, this simple halftoning method does not preserve sufficient image characteristics. For example, suppose black corresponds to 1 and white corresponds to 0. If the original image is a block of gray with a value of 0.3, then the above halftoning method would simply round off the value of 0.3 to 0, which corresponds to white, and thus, resulting in a completely white halftoned image.

To preserve more image characteristics, more complex halftoning methods were developed by adding noise, n[i,j], to the input signal at position [i,j] before quantizing. Two halftoning methods that add noise to the input signal are dithering and error diffusion. Dithering adds noise to an input signal according to a dither matrix. The dither matrix is a grid with a number of slots. Each slot has a numeric entry. The dither matrix is tessellated over the input image. The noise added to an input signal at position [i,j] is determined by an entry in the dither matrix, where the entry is within a slot covering the position [i,j] of the image. Using entries in the dither matrix speeds up halftoning because the input data can be processed in parallel. However, using entries in the dither matrix is also a drawback of dithering because the entries do not take into account of the results of the halftoning of neighboring pixels within the image, leading to a halftoned image of lower quality.

Error diffusion adds noise to an input signal differently than dithering. Instead of using a matrix to determine the amount of noise to add to input signals of an image, error diffusion iterates in raster order through all the pixels of the image. The noise added to each pixel is filtered feedback from the quantization errors that occurred in the neighboring pixels that were already quantized. The image quality of error diffusion overall is better than dithering because error diffusion takes into account of feedback from neighboring pixels. In particular, edges of error-diffused images are sharper and contours appear more natural.

Although error diffusion produces better overall image quality, there are a number of disadvantages in error diffusion. First, error-diffused images tend to appear grainy in low-density ink areas. Error diffusion can also cause wormlike artifacts. Moreover, error diffusion involves more calculations that are performed serially, and therefore, error diffusion is more time-consuming than dithering, which is performed in parallel. Furthermore, another problem with error diffusion is the large number of isolated dots that are produced. Isolated dots are dots without a neighboring dot of the same color. Isolated dots are difficult to print with laser printing technology at high resolution. Error diffusion creates isolated dots within a large proportion of an image, and therefore, many current printers usually have difficulties printing error-diffused images.

A combination of error diffusion and dither may lead to more efficient printing of high quality images.

U.S. Pat. No. 5,930,010 issued Jul. 27, 1999 sets forth a technique in which error diffusion is performed on the C, M, and K color planes, while dither is performed on the Y color plane.

U.S. Pat. No. 6,363,172, entitled "Combined Color Halftoning", discloses combining the C and M planes for dither. First, the patent discloses dithering the C+M signal, which determines where C or M dots should be printed. Then the C signal is dithered with the same mask; since C<C+M, this determines which of the previously chosen dots should be C. The remaining dots are printed magenta. Only one dither mark needs to be used to dither both the C and M planes, with a dot-off-dot result. This patent also discloses an error diffusion variation, in which C+M undergoes error diffusion then if a dot should be printed, they ask 'Is Ccurrent+Cerror>Mcurrent+Merror?' That determines whether a C or M is printed there. The error passing must still occur for both the C and M planes, so this method is more computationally complex than standard error diffusion. The resulting halftone should exhibit more dot-off-dot printing. The patent also describes dither or error diffuse C+M, and then randomly deciding whether to print C or M at each chosen printing location.

U.S. Pat. No. 5,394,252 discloses using a periodic halftoning for some color planes and a non-periodic halftoning for other color planes with the intention for the halftoning to occur on the input color separations, which are the same as the output inks.

SUMMARY

A method and apparatus for performing replacement halftoning is described. In one embodiment, the method comprises dithering a plurality of color channels associated with a first pixel to generate dither halftone outputs, where each of the halftone outputs corresponds to a color channel. The method also includes creating a virtual color channel from two or more of the plurality of color channels, applying error diffusion to the virtual color channel to generate an error diffusion halftone output; and replacing at least one dither halftone output for the color channels with one error diffusion halftone output for the virtual color channel.

DESCRIPTION OF THE DRAWINGS

The present invention will be understood more fully from the description, which follows and from the accompanying drawings, which however, should not be taken to limit the invention to the specific embodiments shown, but are for explanation and understanding only.

DETAILED DESCRIPTION

A method and an apparatus for replacement halftoning are described. In the following description, numerous details are set forth, such as definition of specific color channel definitions, selection criteria, etc., in order to provide a thorough understanding of embodiments of the invention. It will be clear, however, to one of ordinary skill in the art, that these specific details may not be needed to practice every embodiment of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein. A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

Halftoning is applied to color channels of one or more pixels to generate halftone outputs for each of the color channels. The pixels may be part of an image that is being processed (e.g., prepared for printing). The replacement halftoning of the present invention combines multiple techniques of halftoning. In one embodiment, two halftoning techniques are combined. This combination of halftoning techniques may include error diffusion and dithering.

Figure 1A:
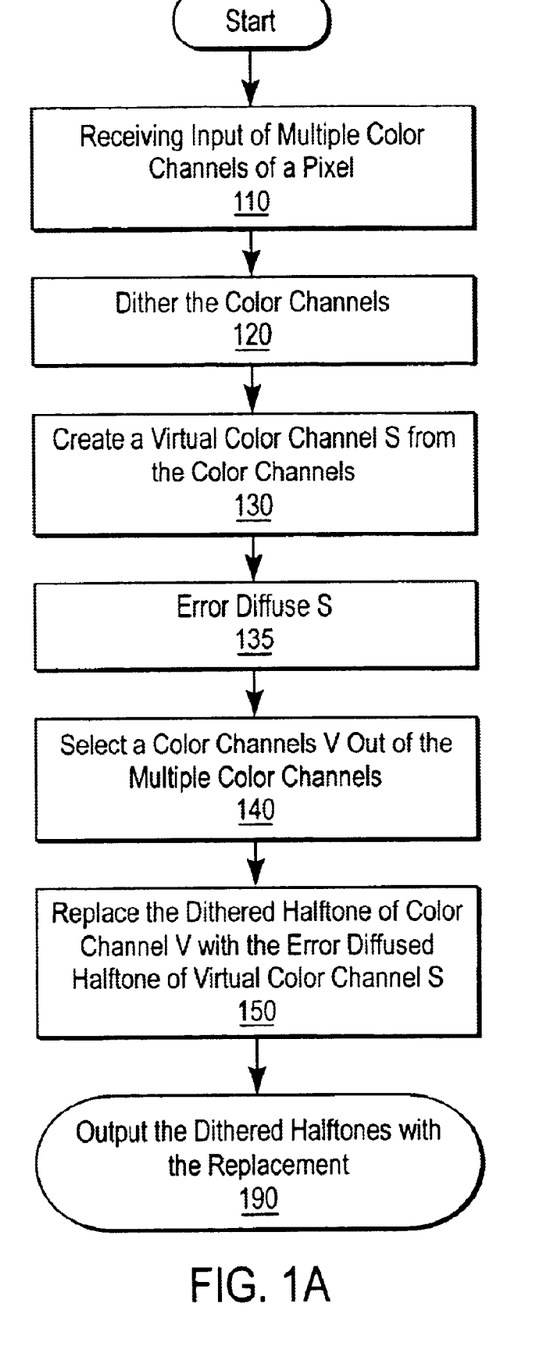
FIG. 1A is one embodiment of a process for performing replacement halftoning on a pixel.

FIG. 1A is a flow diagram of one embodiment of a replacement halftoning process. The process is performed by processing logic that may comprise hardware (e.g., circuitry, dedicated logic, etc.), software (such as is run on a general purpose computer system or a dedicated machine), or a combination of both.

Referring to FIG. 1A, processing logic receives color channels of a pixel processing block (processing block 110). The number of color channels may vary in different embodiments. In one embodiment, there are four color channels including a C channel, a M channel, a Y channel, and a K channel. Each color channel has a value, which varies in different embodiments. In one embodiment, the value of a color channel is 8-bit. In another embodiment, the value of each color channel is 16-bit. It should be appreciated that other combinations of color channels having data of various sizes can be used in other embodiments.

After receiving the color channels, processing logic dithers the color channels to generate a dither halftone output for each color channel input (processing block 120). In one embodiment, four single bit dither halftone outputs are generated from four 8-bit color channels, C, M, Y, and K channels. Each of the single bit halftone outputs corresponds to a distinct color channel.

In addition to being dithered, processing logic processes the color channels of the pixel to create a virtual color channel (S) (processing block 130). There are numerous ways to create the virtual color channel (S) from the color channels. In one embodiment, the virtual color channel (S) equals the maximum value over all of the input color channels at each spatial location. This may be represented as $S[i,j]=\max(C[i,j], M[i,j], Y[i,j], K[i,j])$ where $[i,j]$ represents the spatial location of the pixel.

In another embodiment, an average of the values of the color channels is used to create the virtual color channel S. It should be appreciated that the examples described here are for illustration only and are not intended to limit the scope of the claims.

Processing logic applies error diffusion to the virtual color channel S to generate an error diffusion halftone output (processing block 135). In one embodiment, the Y channel prints dots of higher luminance than the C, M, and K channels, and therefore, error diffusing the Y channel does not make much difference in comparison to dithering the Y channel. As a result, excluding the Y channel from error diffusion does not impact the quality of the halftoned image. When excluding the Y channel, the virtual color channel S can be defined as $$S[i,j]=\max(C[i,j],M[i,j],K[i,j]),$$

where [i,j] represents the position of the pixel.

Processing logic selects a color channel V from among the color channels (processing block 140). The color channel V will be replaced by the error diffused value of S. It is not necessary to include all color channels of the pixel in the selection of the color channel V. For example, in one embodiment, the Y channel is excluded from the selection of the color channel V.

There are various ways to select the color channel V from the group of color channels. One way to select the color channel V is to select the color channel with the maximum value out of all the color channels to be color channel V. Another way to select the color channel V is using the median value among all the color channels to be the color channel V. One should appreciate these examples are described for illustration only and they do not limit the scope of the appended claims.

After selecting the color channel V to replace, processing logic replaces the dither halftone output of the color channel V with the error diffusion halftone output for the virtual color channel S (processing block 150). Processing logic then outputs the set of dithered halftone outputs with the error diffusion output (processing block 190). The output of replaced halftone values produces images of better quality than halftones values generated solely from dithering because the output includes the error diffusion halftone output for the virtual color channel S. Furthermore, the halftone values that are output are generated faster than performing error diffusion on every color channel of a pixel because only the virtual color channel S undergoes error diffusion.

It should be noted that the order of dithering the color channels and creating and applying error diffusion to the virtual color channel S can be switched in another embodiment. In one embodiment, dithering all the color channels and creating and error diffusing the virtual color channel S are performed substantially simultaneously. The various embodiments described here are for illustration only, and one should understand that the present invention is not limited to any particular order.

Figure 1B:
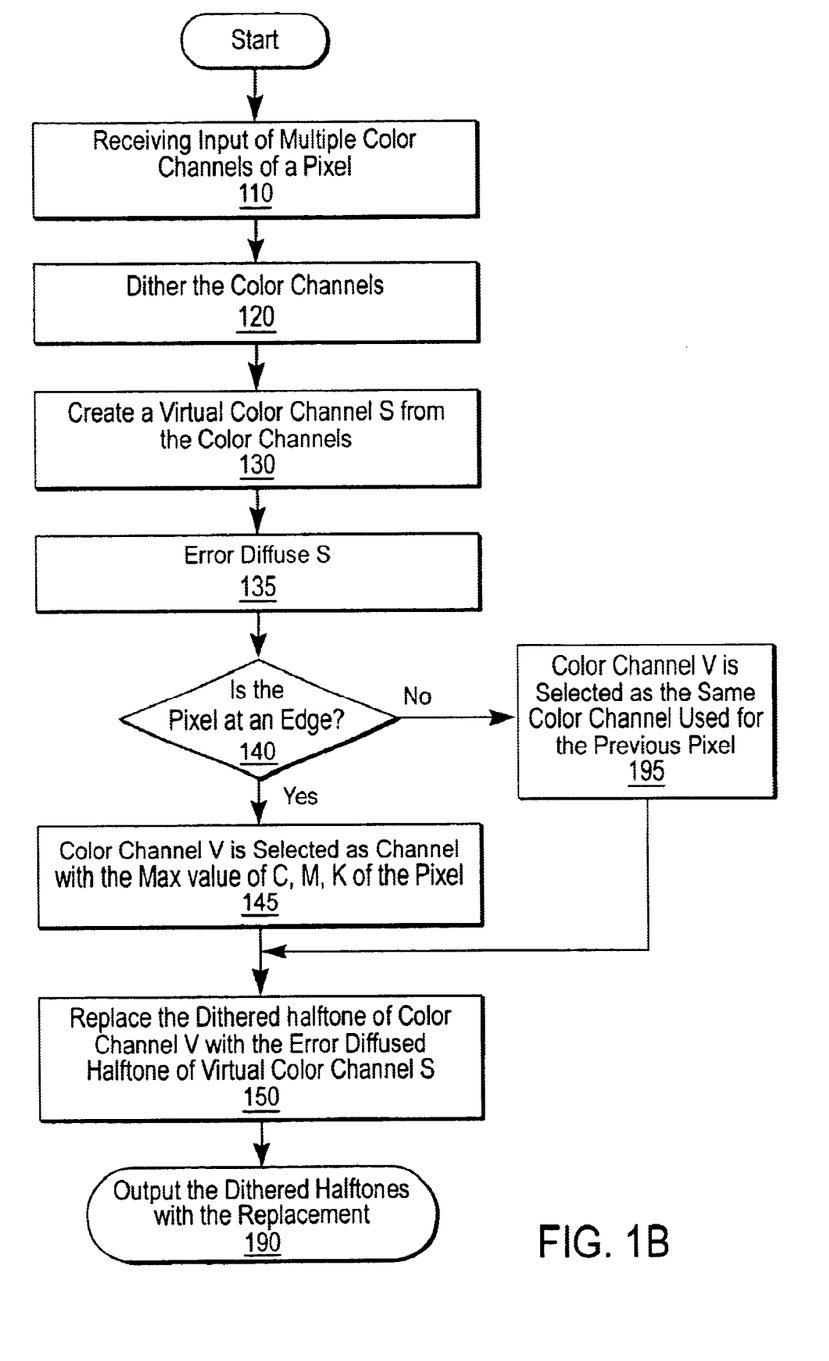
FIG. 1B is an alternative embodiment of a process for performing replacement halftoning on a pixel with edge detection.

FIG. 1B is a flow diagram of an alternative embodiment for performing replacement halftoning on a pixel. Referring to FIG. 1B, processing blocks 110–135 are the same as the corresponding block in FIG. 1A. At processing block 140, processing logic checks whether the pixel being processed is at an edge. If the pixel is at an edge, processing logic selects as the color channel V the cyan, magenta, or black color channel of the pixel having the highest value (processing block 145). If the pixel is not at an edge, processing logic selects as the color channel V the same color channel used for the processing pixel in the row. Then processing logic replaces the dither halftone output with the error diffusion halftone output (processing block 150).

Processing logic outputs the selected halftone value for each color channel for the pixel (processing block 190). These correspond to the error diffusion halftone output that replaced one of the dither halftone output values and the dither halftone output values that were not replaced. Otherwise, the dithered halftone outputs without an error diffusion replacement value are output by the processing logic (processing block 195).

There are various well-known ways to detect whether a pixel is at an edge. In one embodiment, real-time, simple, local, causal edge detection is performed to determine whether the pixel is at an edge. In another embodiment, a pre-processor is used to find the edges in an image before halftoning the image. The embodiments described herein are intended for illustration only, and the present invention is not limited to only these embodiments.

In an alternate embodiment, replacement halftoning uses a predetermined threshold value, referred to herein as EDGE_THRESHOLD, to check whether a pixel is at an edge. In this embodiment, the pixel is at an edge if the difference between the pixel being processed and the pixel to the left or above the pixel being processed exceeds a threshold, EDGE_THRESHOLD, or if the pixel to the left and the pixel above the pixel being processed cause different color channels to be the value of the virtual color channel S. The value of EDGE_THRESHOLD varies in different embodiments. In one embodiment, EDGE_THRESHOLD is set at 40 (for an 8-bit color scale). In another embodiment, the EDGE_THRESHOLD is set at 30 (for an 8-bit color scale). In another embodiment, the EDGE_THRESHOLD is set at 80 (for an 8-bit color scale). The lower the value of the threshold, the sharper the image is in general. But a lower threshold may make smooth gradation areas more grainy. Therefore, the value of the threshold can be adjusted according to the desired image quality. Moreover, with the inclusion of the Y channel, it was harder to find a threshold at which no artifact is generated. Therefore, in one embodiment, the Y channel is excluded from error diffusion. However, with a more sophisticated edge detector and/or a better dither mask, inclusion of the Y channel may not cause such a problem.

In another embodiment, in order to reduce graininess in regions of gradation, the dithered halftone of the selected color channel V is replaced with the error diffusion halftone output only when the pixel is at an edge in the image.

For devices that cannot print isolated dots, error diffusing the S channel may be problematic because error diffusion may result in isolated dots for low-density areas or light areas. One way to reduce isolated dots in the halftoned image is to limit error diffusion to only high-density signals.

Figure 1C:
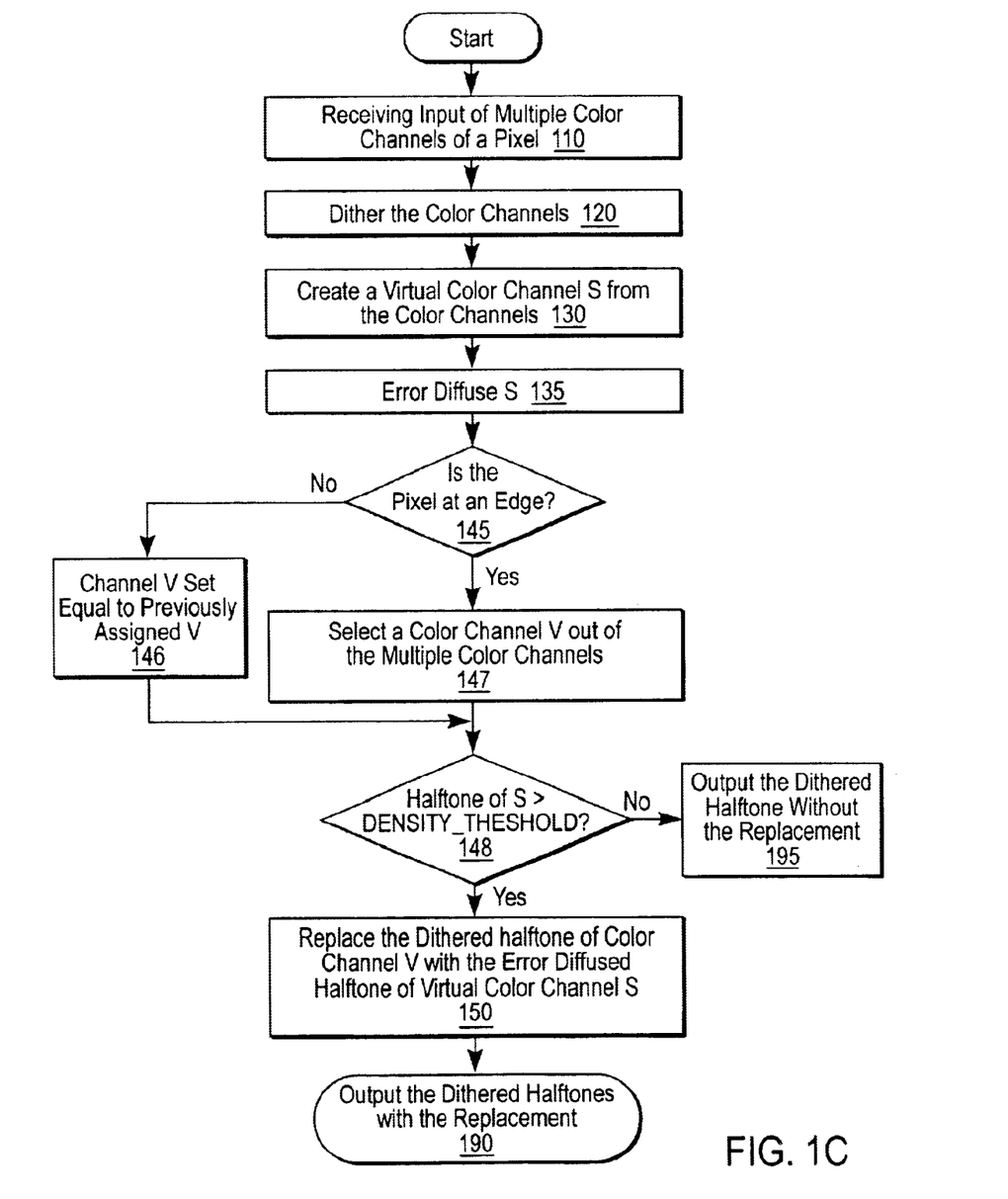
FIG. 1C is another alternative embodiment of a process for performing replacement halftoning on a pixel with a lower bound.

FIG. 1C is a flow diagram of an alternative embodiment of replacement halftoning processing. Referring to FIG. 1C, all the processing blocks 110–135, 150 and 190 are the same as in FIG. 1B. At processing block 145, processing logic determines if the pixel is at an edge. If it is, then processing logic selects a color channel V out of the multiple color channels (processing block 147) and processing transitions to processing block 148. The selection may occur in a number of ways, some of which have been described herein. If not, then processing logic sets the channel V equal to the V value for the previous pixel (processing block 146).

At processing block 148, processing logic checks the value of the virtual color channel S against a pre-determined lower bound, referred to herein as DENSITY_THRESHOLD. If the value of the virtual color channel S exceeds DENSITY_THRESHOLD, processing logic replaces one of the dithered halftone outputs with the error diffusion halftone output (processing block 150) and outputs the dither halftone outputs with the replacement (processing block 190). If not, the dithered halftone output associated with color channel V is not replaced with the error diffusion halftone output of S and processing logic outputs the dither halftone outputs for all color channels (processing block 195). In one embodiment, the error diffusion of the virtual color channel S is not disrupted as the error diffusion halftone output is merely ignored if the value of the virtual color channel S exceeds DENSITY_THRESHOLD.

Placing a lower bound on the density levels may remove isolated dots and problems with areas of low density, however, it may also cause low density edges to become smooth in the halftoned image. To alleviate this problem, the use of the lower bound is limited to areas of flat color. In one embodiment, to check whether the pixel is within a region of flat color determines whether the pixel being processed, a pixel to the left of the pixel being processed, and a pixel above the pixel being processed all have substantially the same input color values. If the input color values are all substantially the same, then the pixel being processed is within a region of flat color. It should be appreciated that other tests to determine whether the pixel is within a flat color region can be employed in various embodiments, and the embodiment described is intended merely an example for illustrating the principle.

Figure 2A:
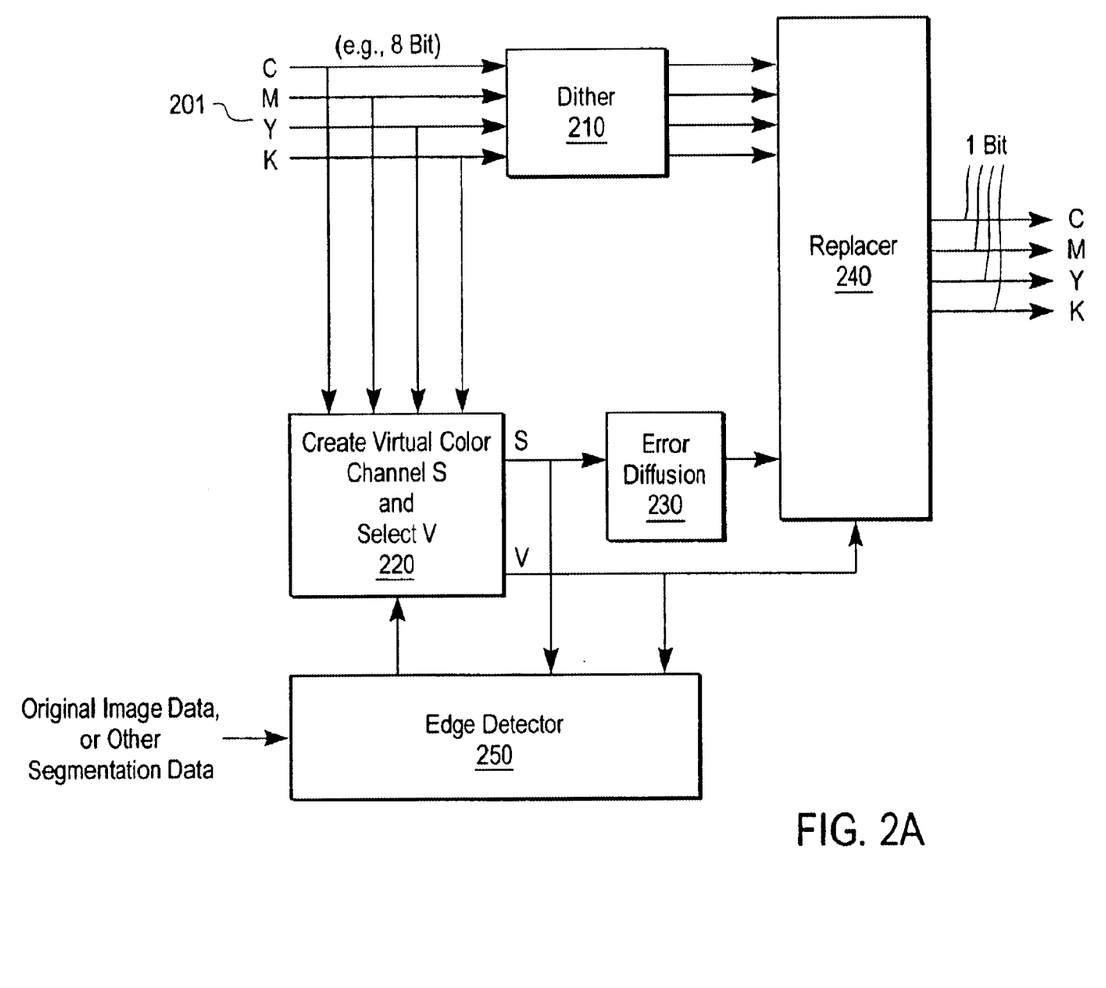
FIG. 2A is a block diagram of one embodiment of a replacement halftoning architecture.

FIG. 2A is a block diagram of an embodiment of an apparatus to process a pixel with replacement halftoning. Each of these blocks may be implemented in hardware (e.g. circuitry, dedicated logic, etc.), software, or a combination of both. Referring to FIG. 2A, four color channels 201 of a pixel are input to a dither block 210 to be dithered. In one embodiment, each of the color channels 201 are 8 bits. The four color channels include a C channel, a M channel, a Y channel, and a K channel. Dither block 210 generates a dithered halftone output for each of the color channel.

The four color channels 201 are also input to virtual channel creation and selection block 220, which creates a virtual color channel S from these four color channels. In addition, virtual channel creation and selection block 220 selects a color channel V[i,j] out of the four color channels 201 for each spatial location [i,j]. For example, in one embodiment, the channel with the maximum value at a given location [i,j] is selected. However, not all color channels are required by virtual channel creation and selection block 220 to create the virtual color channel S and to select the color channel V. For example, in an alternate embodiment, virtual channel creation and selection block 220 excludes the Y channel from the creation of the virtual color channel S and the selection of color channel V.

In one embodiment, the virtual color channel S is input to error diffusion block 230 for error diffusion. Error diffusion block 230 generates an error diffusion halftone output for the virtual color channel S. The error diffusion halftone output from error diffusion block 230 and the dither halftone output from dither block 210 are input to replacer 240. The selected color channel V is also input to replacer 240. Replacer 240 replaces the dither halftone output for the selected color channel V with the error diffusion halftone output for the virtual color channel S. Replacer 240 then outputs the rest of the dither halftone outputs along with the error diffusion halftone output.

In an alternate embodiment, an edge detector 250 is included to detect whether the pixel is at an edge within the image. Edge detector 250 receives the original image data or other segmentation data as an input. The virtual color channel S and the selected color channel V are also input to edge detector 250. Based on these inputs, edge detector 250 determines whether the pixel being processed is at an edge in the image. In one embodiment, edge detector 250 checks a pixel above the pixel being processed and a pixel to the left of the pixel being processed. If the difference between the pixels being compared exceeds a predetermined threshold, then the pixel is determined to be an edge. Otherwise, the pixel is not determined to be an edge. In an alternate embodiment, a pre-processor (not shown) determines where edges are in the image before halftoning the image. Referring to FIG. 2A, the result of the determination from edge detector 250 is input to virtual channel creation and selection block 220.

In one embodiment, the virtual channel creation and selection block 220 operates according to the following:

if ([i,j]=edge)
then V[i,j]=argmax (C[i,j], M[i,j], K[i,j])
else V[i,j]=V[i-1, j]
S[i,j]=(V[i,j]) [i,j]
if pix[i,j]=pix[i-1,j]=pix [i,j-1]
and if S[i,j]<30
then V[i,j]=null
while the edge detector operates as follows
if (dist(max(C[i,j], M[i,j], K[i,j], S[i-1,j])>40)
else if (dist(max(C[i,j], M[i,j], K[i,j], S[i,j-1])>40)
else if V[i-1,j]!=V[i,j-1]
then [i,j] is edge.

Figure 2B:
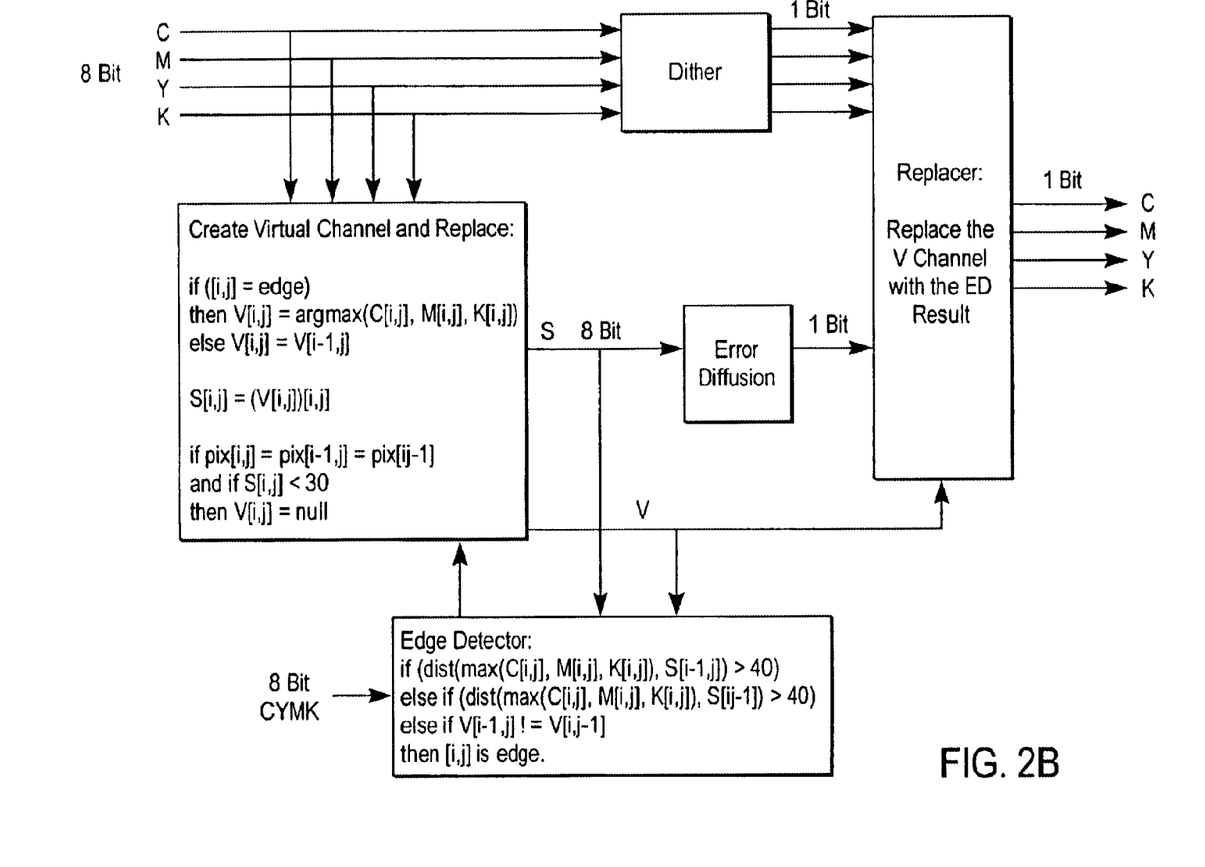
FIG. 2B is a more detailed embodiment of a replacement halftoning architecture.

Thus, if the pixel is at an edge, the channel of the color channels selected as channel V is one of the cyan, magenta, and black channels having the largest value, and if the pixel is not at an edge, the channel selected as the channel V is the channel selected as the channel V for the previous pixel in the row. Also, the value of the virtual channels based on the value of the color channel V. Note that other threshold values may be used, such as those described above. This embodiment is shown in FIG. 2B.

Figure 3:
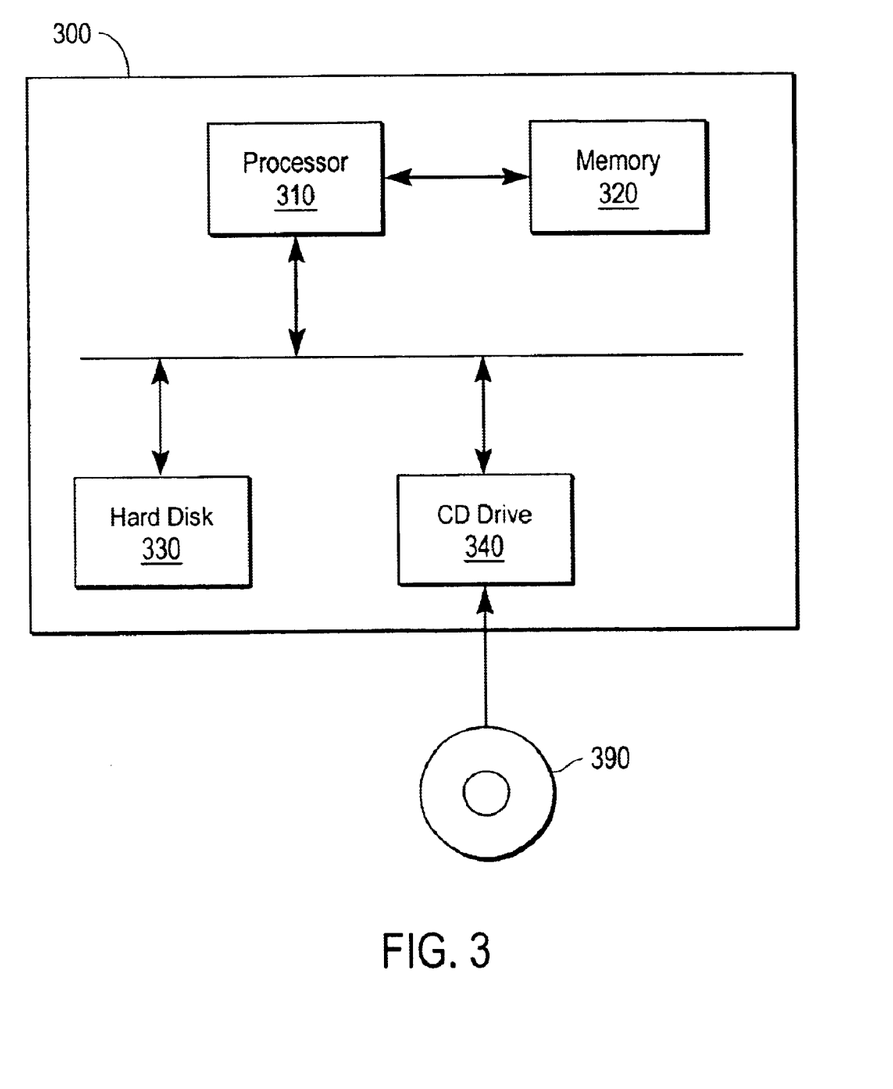
FIG. 3 shows an exemplary embodiment of a machine and a machine-readable medium.

FIG. 3 shows an embodiment of a machine-readable medium with instructions stored thereon and an exemplary machine 300 that reads the instructions. In one embodiment, the machine-readable medium is a compact disk 390. In another embodiment, the machine-readable medium is a hard drive 330 within the machine 300. In one embodiment, the machine 300 reads the instructions stored on the machine-readable medium and a processor 310 within the machine 300 executes the instructions. In one embodiment, the instructions cause the machine 300 to dither a set of color channels of a pixel to generate a set of dithered halftones. The instructions also cause the machine to create a virtual color channel S, and to error diffuse the virtual color channel S to generate an error-diffused halftone. The instructions further cause the machine to select a color channel V out of the set of color channels and to replace the dithered halftone of the color channel V with the error-diffused halftone of the virtual color channel S.

In an alternate embodiment, the instructions stored on the machine-readable medium causes the machine to detect whether the pixel is at an edge in the image. If the pixel is at an edge, then the dithered halftone of the selected color channel V is replaced with the error-diffused halftone of the virtual color channel S. The dithered halftones with the error-diffused replacement are then output. Otherwise, the dithered halftone of channel V is not replaced and all the dithered halftones are output without the error-diffused halftone.

The foregoing discussion merely describes some exemplary embodiments of the present invention. One skilled in the art will readily recognize from such discussion, the accompanying drawings and the claims that various modifications can be made without departing from the spirit and scope of the present invention.

What is claimed is:

1. A method comprising:
applying a first halftoning technique to a plurality of color channels associated with a first pixel to generate a first plurality of halftone outputs, each of the plurality of halftone outputs corresponding to a color channel;

creating a virtual color channel from two or more of the plurality of color channels;

applying a second halftoning technique, different from the first halftoning technique, to the virtual color channel to generate a replacement halftone output; and replacing at least one of the first plurality of halftone outputs for the color channels with a replacement halftone output for the virtual color channel.

2. A method comprising:

dithering a plurality of color channels associated with a first pixel to generate a plurality of dither halftone outputs, each of the plurality of dither halftone outputs corresponding to a color channel;

creating a virtual color channel from two or more of the plurality of color channels;

applying error diffusion to the virtual color channel to generate an error diffusion halftone output, and replacing at least one dither halftone output for the color channels with the error diffusion halftone output for the virtual color channel.

3. The method of claim 2 further comprising selecting a color channel out of the plurality of color channel, and wherein replacing the at least one dither halftone output comprises replacing a dithered halftone for a selected color channel with the error diffusion halftone output for the virtual color channel if the pixel is at an edge.

4. The method of claim 3 further wherein creating the virtual color channel comprises selecting one of the color channels with the maximum value of C, M, Y or K color channels.

5. The method referred in claim 4 wherein selecting one of the color channels occurs if the pixel is at an edge.

6. The method of claim 3 further wherein creating the virtual color channel comprises selecting a previously selected virtual color channel used for the previous pixel.

7. The method defined in claim 6 wherein selecting the same virtual color channel used for the previous pixel occurs if the pixel is not at an edge.

8. The method of claim 3 further comprising detecting whether the pixel is at the edge.

9. The method of claim 8, wherein detecting whether the first pixel is at the edge comprises comparing the pixel with a second pixel above the first pixel and a third pixel to the left of the pixel.

10. The method of claim 2 further comprising comparing a selected color value of the virtual color channel with a predetermined threshold value, and wherein replacing the at least one dither halftone output with the error diffusion halftone output occurs if the selected color value of the virtual color channel exceeds the pre-determined threshold value.

11. The method of claim 2 further comprising:

selecting a color channel out of the plurality of color channels; and determining whether the first pixel and a second pixel located above the first pixel and a third pixel to the left of the first pixel have substantially the same value and replacing the at least one dither halftone output with the one error diffusion output if the first, second, and third pixel values are substantially the same.

12. The method of claim 2, wherein creating the virtual color channel comprises choosing a color channel having a maximum value among the plurality of color channels.

13. The method of claim 2, wherein creating the virtual color channel comprises averaging values of the plurality of color channels.

14. The method of claim 2, wherein the plurality of color channels includes a C channel, a M channel, a Y channel, and a K channel, and the virtual color channel is created from a group of color channels consisting of the C channel, the M channel, and the K channel.

15. An article of manufacture having one or more machine-readable media storing instructions which, when executed by a machine, cause the machine to:

dither a plurality of color channels associated with a first pixel to generate a plurality of dither halftone outputs, each of the plurality of halftone outputs corresponding to a color channel;

create a virtual color channel from two or more of the plurality of color channels;

apply error diffusion to the virtual color channel to generate an error diffusion halftone output; and replace at least one dither halftone output for the color channels with one error diffusion halftone output for the virtual color channel.

16. The machine-readable medium of claim 15, further comprising instructions which when executed cause the system to create a virtual color channel by selecting the one color channel of the plurality of color channels having the maximum value if the pixel is at an edge or the same virtual color channel used for the previous pixel if the first pixel is not at an edge.

17. The machine-readable medium of claim 16, further comprising instructions which when executed cause the system to detect whether the pixel is at the edge.

18. The machine readable-medium of claim 17, wherein the instructions to detect whether the first pixel is at the edge comprise instructions to compare the pixel with a second pixel above the first pixel and a third pixel to the left of the pixel.

19. The machine readable-medium of claim 15, further comprising instructions which when executed cause the system to compare a selected color value of the virtual color channel with a predetermined threshold value, and wherein replacing the at least one dither halftone output with the error diffusion halftone output occurs if the selected color value of the virtual color channel exceeds the pre-determined threshold value.

20. The machine-readable medium of claim 15, further comprising instructions which when executed causes the system to:

select a color channel out of the plurality of color channels; and determine whether the first-pixel and a second pixel located above the first pixel and a third pixel to the left of the first pixel to have substantially the same value and replacing the at least one dither halftone output with the one error diffusion output if the first, second, and third pixel values are substantially the same.

21. The machine-readable medium of claim 20, wherein instructions to create the virtual color channel comprise instructions to set the virtual color channel to the maximum value of the plurality of color channels at each spatial location.

22. The machine-readable medium of claim 15, wherein instructions to create the virtual color channel comprise instructions to set the virtual color channel to the average value of the plurality of color channels.

23. The machine-readable medium of claim 15, wherein the plurality of color channels includes a C channel, a M channel, a Y channel, and a K channel, and the virtual color channel is created from a group of color channels consisting of the C channel, the M channel, and the K channel.

24. An apparatus comprising:

a first circuitry to dither a plurality of color channels associated with a first pixel to generate a plurality of dither halftone outputs, each of the plurality of halftone outputs corresponding to a color channel;

a second circuitry to create a virtual color channel from two or more of the plurality of color channels;

a third circuitry to apply error diffusion to the virtual color channel to generate an error diffusion halftone output; and a fourth circuitry to replace at least one dither halftone output for the color channels with one error diffusion halftone output for the virtual color channel.

25. The apparatus of claim 24 further comprising a fourth circuitry to select a color channel out of replacing a dither halftone output for the color channels with one diffusion halftone output for the virtual color channel.

26. The apparatus of claim 25 further comprising an edge detector to detect whether the pixel is at an edge, wherein the fourth circuitry replaces the dithered halftone of the selected color channel with the error diffusion halftone value of the virtual color channel if the pixel is at the edge.

27. A method comprising:

receiving a pixel of an image, wherein the pixel is represented with a plurality of color channels;

performing error diffusion on a non-color separation channel to provide sharp edges for a printed version of the image; and dithering remaining channels of the plurality of color channels.

* * * * *